(12) United States Patent
van den Bossche

(10) Patent No.: US 6,279,246 B1
(45) Date of Patent: Aug. 28, 2001

(54) DEVICE AND METHOD FOR DETERMINING THE POSITION OF A POINT

(75) Inventor: Alex van den Bossche, Walshoutem (BE)

(73) Assignee: N.V. Krypton Electronic Engineering, Leuven (BE)

( * ) Notice: Subject to any disclaimer, the term of this patent is extended or adjusted under 35 U.S.C. 154(b) by 0 days.

(21) Appl. No.: 09/403,386
(22) PCT Filed: Apr. 15, 1998
(86) PCT No.: PCT/BE98/00055
 § 371 Date: Feb. 3, 2000
 § 102(e) Date: Feb. 3, 2000
(87) PCT Pub. No.: WO98/48241
 PCT Pub. Date: Oct. 29, 1998

(30) Foreign Application Priority Data

Apr. 21, 1997 (BE) .................................................. 9700366

(51) Int. Cl.[7] .................................................. G01B 11/03
(52) U.S. Cl. .............................. 33/556; 33/1 CC; 33/559; 356/375
(58) Field of Search .................................. 33/556, 1 CC, 33/503, 504, 557, 558, 559, 560, 561, 1 MP, 286, 288; 356/375

(56) References Cited

U.S. PATENT DOCUMENTS

| | | | |
|---|---|---|---|
| 4,691,446 | * | 9/1987 | Pitches et al. ........................ 33/1 MP |
| 5,150,529 | * | 9/1992 | Collingwood ............................ 33/503 |
| 5,440,392 | * | 8/1995 | Pettersen et al. ..................... 356/375 |
| 5,535,522 | * | 7/1996 | Jackson ............................. 33/203.18 |
| 5,729,475 | * | 3/1998 | Romanik, Jr. ......................... 356/375 |
| 5,748,505 | * | 5/1998 | Greer .................................... 356/375 |
| 5,831,735 | * | 11/1998 | Corby, Jr. ............................ 356/375 |
| 5,920,394 | * | 7/1999 | Gelbart et al. ........................ 356/375 |
| 5,973,788 | * | 10/1999 | Pettersen et al. ..................... 356/375 |

FOREIGN PATENT DOCUMENTS

| | | |
|---|---|---|
| 33 40 317 | 8/1984 | (DE) . |
| WO 93/07443 | 4/1993 | (WO) . |
| WO 97/14015 | 4/1997 | (WO) . |

* cited by examiner

Primary Examiner—Christopher W. Fulton
(74) Attorney, Agent, or Firm—Browdy & Neimark

(57) ABSTRACT

The invention concerns a method for determining the position of a point, in which use is made of a holder (1) with a measuring point (6) and at least three reference points (2, 3, 4), where said measuring point (6) is placed against the point which it is wished to measure, the position of said reference points (2, 3, 4) is measured and the position of said point is calculated, in which use is made of a holder (1) on which the position of said measuring point (6) is determined by holding the latter at a fixed point, rotating the holder (1) in various relative positions, then measuring the positions of the reference points (2, 3, 4) for at least two different positions of the holder (1), and calculating the relative position of the measuring point (6) with respect to the reference points (2, 3, 4).

16 Claims, 2 Drawing Sheets

DEVICE AND METHOD FOR DETERMINING THE POSITION OF A POINT

CROSS REFERENCE TO RELATED APPLICATION

The present application is the national stage under 35 U.S.C. 371 of PCT/BE98/00055, filed Apr. 15, 1998.

The invention concerns a method for determining the position of a point, in which use is made of a holder with, on the one hand, at least three reference points not in a straight line, whose positions with reference to each other are known, and on the other hand, a measuring point, where said measuring point is placed against the point whose position has to be determined, the position of said reference points is then measured, and, on the basis of the position of said reference points, the position of said point is calculated.

In the present state of the art, use is made of a holder whose measuring point is assumed to occupy at all times a fixed position with respect to the reference points. This frequently results in an inaccuracy in measuring the position of said point, since in some cases this position can alter.

The German patent application DE 3340317 describes a long holder provided with two reference points, which when measuring the position of the point has to be rotated about its axis. When said holder is rotated in this way, it unavoidably suffers an angular deviation, so that an imprecise measurement is made. Also, the distance from the measuring point to the reference points has to be measured manually with great accuracy in order to be able to determine the position of said measuring point, which can lead to errors that cannot be ignored. Furthermore, this distance also varies according to the flexure of the bar, with the result that in most cases a sufficiently accurate measurement of the position of a particular point is not possible.

The invention aims to overcome all these disadvantages by presenting a measuring system in which measurements can be carried out with very great accuracy.

To this end, use is made of a holder of which the position of said measuring point is determined by holding the latter in a fixed position, rotating the holder in various positions, then measuring the positions of the reference points for at least two different positions of the holder, and calculating the relative position of the measuring point with respect to the reference points from the measured positions of said reference points.

For that purpose, the position of said reference points can be advantageously measured several times for each position of the holder, with an average position being determined for at least three reference points, and the relative position of the measuring point or of said point is calculated from the average position of at least three reference points.

In an advantageous manner, the position of a point on an object can be determined by measuring the position of said reference points for at least one position of the holder, where the measuring point is placed against said point, and then calculating the position of said point, which essentially corresponds with the position of the measuring point, from the positions of the reference points.

In a particularly advantageous manner, light points, such as light-emitting diodes (LEDs) can be used for said reference points.

According to a particular embodiment of the method according to the invention, said reference points are observed from at least two different positions by preferably addressable camera.

The invention also concerns a device for measuring the position of a point, with a holder that is provided with at least three reference points and a measuring point, where said device comprises detectors which act with a calculation device so that the position of said reference points can be determined, more specifically by applying the method according to the invention.

According to a preferred embodiment of the device, according to the invention, said measuring point is provided with a measuring point which is detachably mounted on said holder.

According to a further preferred embodiment of the invention, said detectors comprise at least two addressable optical cameras.

Said reference points preferably consist of light points, more specifically light-emitting diodes (LEDs).

Other features and advantages of the invention will be apparent from the following description of an embodiment of the method and the device according to the invention; this description is given by way of example only, and in no way limits the scope of the protection claimed; the reference figures used below relate to the attached drawings.

In the different drawings, the same reference figures refer to the same or similar elements.

Figure 1:
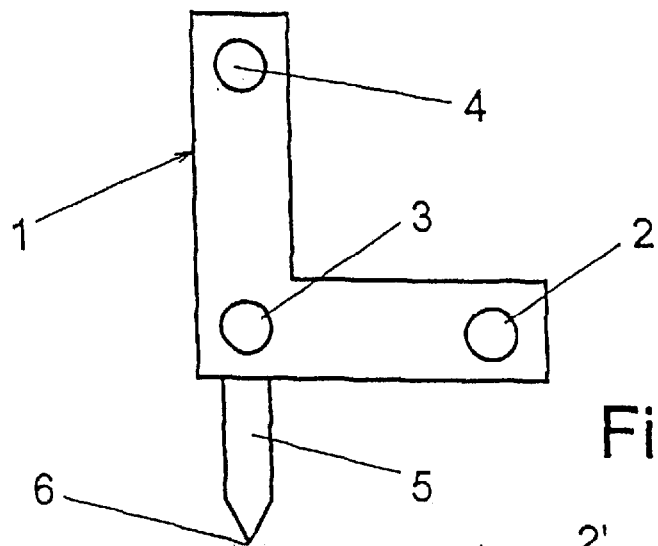
FIG. 1 is a schematic view of a holder with three reference points and a measuring pin.

The device shown in FIG. 1, according to the invention, comprises a holder 1 with three reference points 2, 3 and 4 which are fixed with respect to said holder 1. Further, the holder 1 is provided with a detachably-mounted measuring pin 5 with a measuring point 6. This device also comprises at least one detector—not shown—more specifically an optical camera, which can observe said reference points 2, 3 and 4 from at least two different known positions. The device is also provided with a calculating mechanism—also not shown—in the form of a computer, which enables the spatial position of said reference point to be determined by known mathematical calculation, from the positions of the camera and the position of the reference points 2, 3 or 4 observed by said camera.

By calculating the positions of said reference points 2, 3 and 4, in this way it is possible to know the position of the holder 1 with respect to a fixed reference system.

Figure 2:
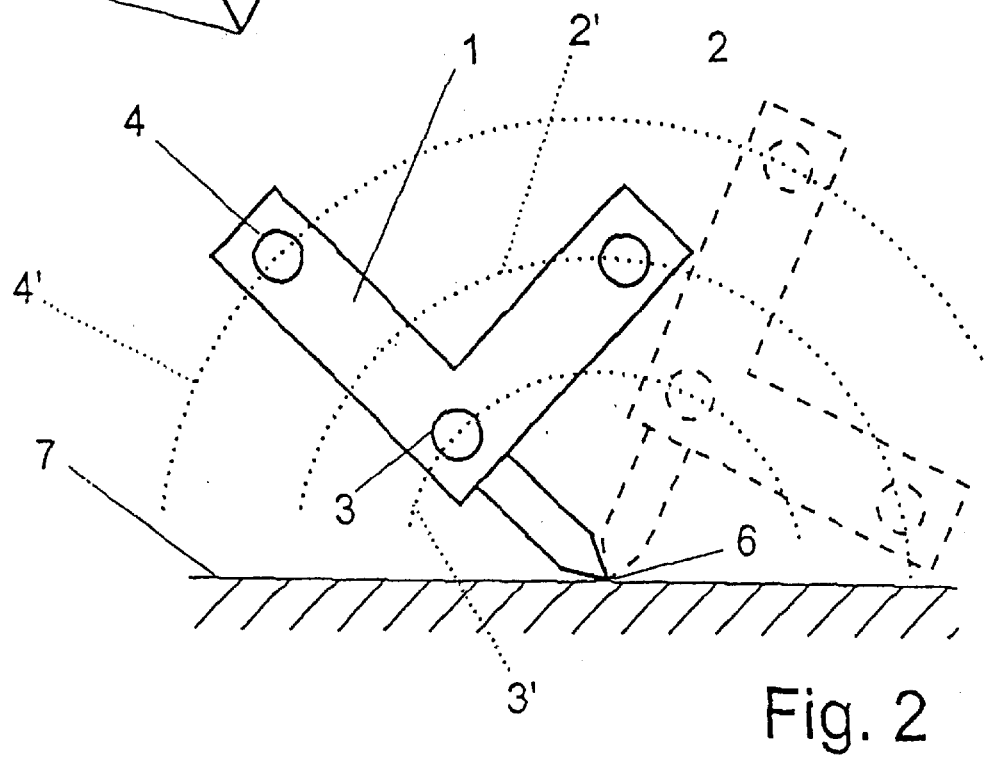
FIG. 2 is a schematic representation of two positions of a holder placed on a surface.

In order to determine the relative position of the measuring point 6 with respect to said reference points 2, 3 and 4, following the method according to the invention, the measuring point 6 of the holder 1 is held at a fixed place. This can be done for example by placing said measuring point 6 against a solid surface 7, as shown in FIG. 2.

Next, the holder 1 is rotated with respect to said measuring point 6, and the position of the reference points 2, 3 and 4 is determined for at least two different positions of the holder 1. A second position of the holder 1 is shown in FIG. 2 by a dotted line.

During the rotation of the holder 1, each of the reference points 2, 3 and 4 lie on a convex surface. The respective convex surfaces 2', 3' and 4' are shown schematically by a dotted line, and have the same centre that coincides with the measuring point 6.

In this way, the position of the measuring point 6 is calculated from the measured positions of the reference points 2, 3 and 4 for two different positions or orientations of the holder 1.

When the relative position of the measuring point 6 is determined in this way with respect to the three reference points 2, 3 and 4, the position of any point on an object can be derived from this. This is done by placing the measuring point 6 with the holder 1 against this point to be measured on the object and then determining the position of the holder 1, and thus the position of said measuring point 6, by measuring the position of the reference points 2, 3 and 4.

Figure 4:
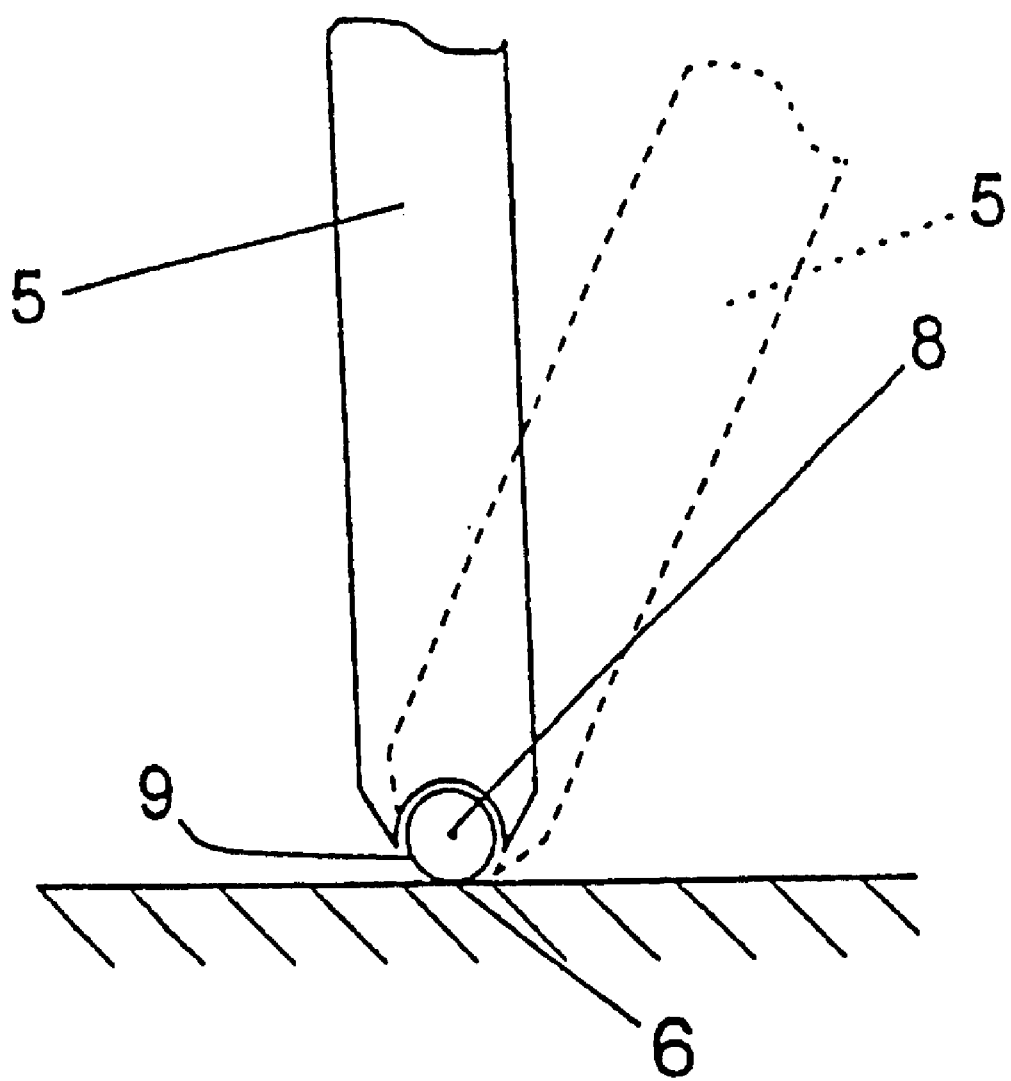
FIG. 4 is a schematic longitudinal cross-section of a part of a measuring pin provided with a measuring ball.

In another possible embodiment of the method according to the invention, use is made of a measuring pin 5, as shown in FIG. 4. Said pin 5 is provided at its free end with a measuring ball 9 with a centre point 8 and a known radius r, and is further constructed such that it can rotate about the centre 8, which thus forms a point of rotation. As a consequence, the above-mentioned measuring point 6 lies on the surface of said ball 9.

When the holder 1 with the measuring ball 9 is brought up against the point to be measured, various positions of the reference points 2, 3 and 4 are measured during this movement. From these positions, the direction and sense in which the holder 1 has moved in order to bring it to the point to be measured are determined.

According to the method described above, the position of said centre point or point of rotation 8 can be calculated from the measured positions of the reference points 2, 3 and 4 for different rotation positions of the holder 1 with respect to said centre point 8, and the position of the measuring point 6 can be calculated from the radius r of the measuring ball 9 and the above-mentioned direction and sense.

The method according to the invention permits the measuring pin 5 in the holder 1 to be replaced by another measuring pin 5 with a shape to suit the location of the points on the object whose positions are to be measured. With the help of the above method it is possible in a simple and rapid way to determine the relative position of the measuring point 6 of any measuring pin 5 mounted in the holder 1, with respect to the reference points 2, 3 and 4.

Figure 3:
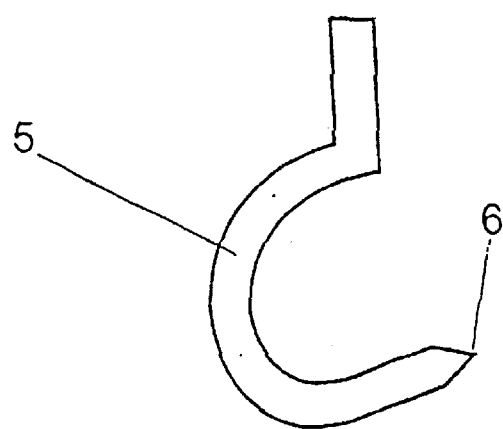
FIG. 3 is a schematic representation of a measuring pin.

An example of a measuring pin 5 is shown in FIG. 3. This measuring pin is hook-shaped, making it possible to measure the positions of points on an object that are difficult to reach.

In order to reduce the influence of electrical or mechanical noise on the measured or calculated positions, and thus to achieve greater accuracy, each position of a reference point 2, 3 and 4 is measured several times with a relatively high frequency. From the various measurements of the same reference point 2, 3, 4, the average is calculated, thus reducing the influence of the noise and obtaining a more accurate determination of the position of the reference points.

The reference points 2, 3 and 4 of the holder 1 preferably consist of light points, such as lamps or light-emitting diodes (LEDs). In order to measure the position of these reference points 2, 3 and 4, two optical cameras are used. These cameras are placed at an angle to each other, each at a known but different position.

In a preferred embodiment of the method according to the invention, addressable cameras are chosen for these cameras. The use of such cameras permits measurement and calculation of the position of the reference points to be carried out very fast and with very high accuracy. In this case, the measuring system described in Belgian patent application 9700143 can be applied.

In a particular embodiment of the method according to the invention, the position of reference points 2, 3 and 4 is measured in turn. When the reference points are formed by LEDs, these are each activated separately in an order known to the calculating mechanism.

In a variant of the above embodiment of the method according to the invention, said embodiment is provided with a switch—not shown in the drawings—which permits a signal to be given when the holder 1 is stationary. Said switch gives said signal or another signal to the calculation mechanism and/or the cameras, such that that a measurement is made of the position of the different reference points 2, 3 and 4. The switch is operated manually, for example by means of a simple push-button. In certain cases, a switch can be provided that is operated automatically so that a measurement of the position of said reference points is made when, with the help of the cameras or other detection systems, it is found that the reference points 2, 3 and 4 are essentially no longer moving.

The switch can in some cases act in conjunction with the measuring point 6, such that said signal is generated when said measuring point 6 is placed against an object, or in other words against a point to be measured. Such a sensor then forms a so-called contact sensor, and ensures that when the position of the measuring point 6 is determined, the latter is in contact with the point on an object to be measured.

The above-mentioned switch is preferably mounted on the holder 1.

In another embodiment of the device according to the invention, at least some of the reference points are located on a circle which encloses said holder, such that the position of at least three reference points can be observed and measured by the cameras, independently of the position of the holder 1. Preferably, the position of more than three reference points is measured, such that, by redundancy, a more accurate result is obtained of the position of the measuring point 6.

The device according to the invention further comprises means which in themselves are already known, permitting a warning signal to be given when the tolerances on the positions measured are exceeded. This may be the case when for example one of the reference points has come loose, or when the measuring point 5 has moved somewhat with respect to the holder 1.

The invention is of course not limited to the method described above and the device shown in the drawings. For example, the holder 1 can be provided with a great variety of reference points, and these can take various forms.

The holder can also be provided with reference points with another form of light points, for example reflectors or ultrasonic sound sources, with the above-mentioned detectors being formed by suitable microphones.

What is claimed is:

1. Method for determining the position of a point, in which use is made of a holder (1) with a measuring point (6) and at least three reference points (2, 3, 4) not in a straight line, where said measuring point (6) is placed against the point which is to be measured, the position of said reference points (2, 3, 4) is then measured, and on the basis of the position of said reference points (2, 3, 4), the position of said point is calculated, whereby the position of said measuring point (6) is determined by holding the latter at a fixed point, rotating the holder (1) in various positions, then measuring the positions of the reference points (2, 3, 4) for at least two different positions of the holder (1), and calculating the relative position of the measuring point (6) with respect to the reference points (2, 3, 4) from the measured positions of said reference points (2, 3, 4).

2. Method according to claim 1, characterised in that said holder (1) is rotated in different positions with respect to said measuring point (6).

3. Method according to claim 1, characterised in that said holder (1) is rotated in different positions with respect to a rotation point (8), at a known distance (r) from said measuring point (6), where the relative position of said rotation point (8) with respect to the measuring point (6) is determined from the direction of movement of said holder (1) when said measuring point (6) is placed against the point whose position is to be determined.

4. Method according to claim 1, characterised in that the position of said reference points (2, 3, 4) is measured several times for the same position of the holder (1), where an average position is determined for at least three reference points (2, 3, 4), and the relative position of the measuring point (6) or of said point is calculated from the average position of at least three reference points (2, 3, 4).

5. Method according to claim 1, characterised in that the position of a point on an object is determined by measuring the position of said reference point (2, 3, 4) for at least one position of the holder (1) where the measuring point (6) is placed against said point, and the position of said point, which essentially corresponds with the position of the measuring point, is then calculated from the positions of said reference points (2, 3, 4).

6. Method according to claim 1, characterised in that light points such as light-emitting diodes (LEDs) are used for said reference points (2, 3, 4).

7. Method according to claim 1, characterised in that said reference points (2, 3, 4) are observed from at least two different positions by a preferably addressable camera.

8. Method according to claim 1, characterised in that it is sensed when said detector (1) is essentially stationary, and the position of the reference points (2, 3, 4) is measured when said detector (1) is essentially stationary.

9. Method according to claim 1, wherein said holder (1) is used with an interchangeable measuring pin (5) whose free end forms the above-mentioned measuring point (6).

10. Device for applying the method as defined in claim 1, said device comprising: a holder (1) provided with at least three reference points (2, 3, 4) and a measuring point (6); and detectors which operate with a calculating mechanism to determine the position of said reference points (2, 3, 4), wherein said device further comprises a measuring pin (5) detachably mounted on said holder (1) and defining said measuring point.

11. Device according to claim 10, characterised in that said detectors comprise at least two addressable optical cameras.

12. Device according to claim 10 or 11, characterized in that said reference points (2, 3, 4) consist of light points, more specifically light-emitting diodes (LEDs).

13. Device according to claim 10 or 11, characterised in that at least some of said reference points (2, 3, 4) are located on a circle which encloses said holder (1), such that the position of at least three reference points (2, 3, 4) can be observed and measured by said detectors, independently of the position of said holder (1).

14. Device according to claim 10 or 11, characterised in that it comprises a switch that enables a signal to be given whenever the holder (1) is stationary or the measuring point (6) is placed against a point to be measured, where this signal determines when the position of said measuring point (6) has to be measured.

15. Device according to claim 14, characterised in that said switch is provided on the holder (1).

16. Method for calibrating a holder (1) with a measuring point (6) and at least three reference points (2, 3, 4) not in a straight line, characterised in that said measuring point (6) of the holder (1) is kept at a fixed position, then the holder (1) is rotated in various positions, the positions of the reference point (2, 3, 4) are measured for at least two different positions of the holder (1), and the relative position of the measuring point (6) with respect to the reference points (2, 3, 4) is calculated from the relative positions of the reference points (2, 3, 4).

\* \* \* \* \*